United States Patent
Guillez et al.

(10) Patent No.: US 6,874,841 B2
(45) Date of Patent: Apr. 5, 2005

(54) VEHICLE FOLDING ROOF, COMPRISING THREE ELEMENTS OF WHICH ONE IS NOT LINKED TO THE REAR ELEMENT

(75) Inventors: Jean-Marc Guillez, Cirieres (FR); Gérard Oueveau, Le Pin (FR)

(73) Assignee: France Design, Le Pin (FR)

( * ) Notice: Subject to any disclaimer, the term of this patent is extended or adjusted under 35 U.S.C. 154(b) by 0 days.

(21) Appl. No.: 10/451,929

(22) PCT Filed: Dec. 18, 2001

(86) PCT No.: PCT/FR01/04039
§ 371 (c)(1),
(2), (4) Date: Jun. 18, 2003

(87) PCT Pub. No.: WO02/49865
PCT Pub. Date: Jun. 27, 2002

(65) Prior Publication Data
US 2004/0061355 A1 Apr. 1, 2004

(30) Foreign Application Priority Data
Dec. 19, 2000 (FR) ............................................ 00 16590

(51) Int. Cl.[7] .................................................. B60J 7/14
(52) U.S. Cl. ............. 296/108; 296/107.16; 296/107.19
(58) Field of Search ...................... 296/107.01, 107.16, 296/107.17, 107.18, 107.19, 107.2, 108

(56) References Cited

U.S. PATENT DOCUMENTS

| 3,575,464 A | * | 4/1971 | Himka et al. | 296/117 |
| 5,209,544 A | * | 5/1993 | Benedetto et al. | 296/107.18 |
| 5,558,388 A | * | 9/1996 | Furst et al. | 296/107.2 |
| 6,053,560 A | * | 4/2000 | Rothe | 296/108 |
| 2001/0020793 A1 | * | 9/2001 | Eberle | 296/108 |
| 2003/0080580 A1 | * | 5/2003 | Obendiek | 296/107.17 |
| 2003/0184116 A1 | * | 10/2003 | Guillez et al. | 296/107.17 |
| 2004/0012223 A1 | * | 1/2004 | Guillez et al. | 296/108 |
| 2004/0061355 A1 | * | 4/2004 | Guillez et al. | 296/108 |

FOREIGN PATENT DOCUMENTS

| CH | 650 980 A5 | * | 8/1985 | 296/108 |
| DE | 37 33 892 A1 | * | 4/1989 | 296/107.17 |
| FR | 2 693 956 A1 | * | 1/1994 | 296/107.09 |
| FR | 2 694 245 A1 | * | 2/1994 | 296/107.01 |
| FR | 2 696 375 A1 | * | 4/1994 | 296/107.09 |
| FR | 2 699 868 A1 | * | 7/1994 | 296/108 |

* cited by examiner

Primary Examiner—D. Glenn Dayoan
Assistant Examiner—Paul Chenevert
(74) Attorney, Agent, or Firm—Nawrocki, Rooney & Sivertson, P.A.

(57) ABSTRACT

The invention concerns a folding roof wherein the front element (1) is linked to the intermediate element (2), the rear element (3) is not linked to the intermediate element (2) and is mobile towards the rear deck (5) through driving means independent of those controlling the displacement of the intermediate element (2) and of the front element (1) towards the rear deck (5). The intermediate element is linked to the vehicle body by two arms (6, 7) articulated to said body and to said intermediate element (2), one of said two arms (6, 7) being associated with means controlling its pivoting, the front of the intermediate element (2) being linked to the front element (1) by two levers (13, 14) articulated to said intermediate element (2) and to said front element (1), one (6) of said two arms being linked to one (14) of said levers by a link rod (19) articulated to said arm (6) and said lever (14).

4 Claims, 1 Drawing Sheet

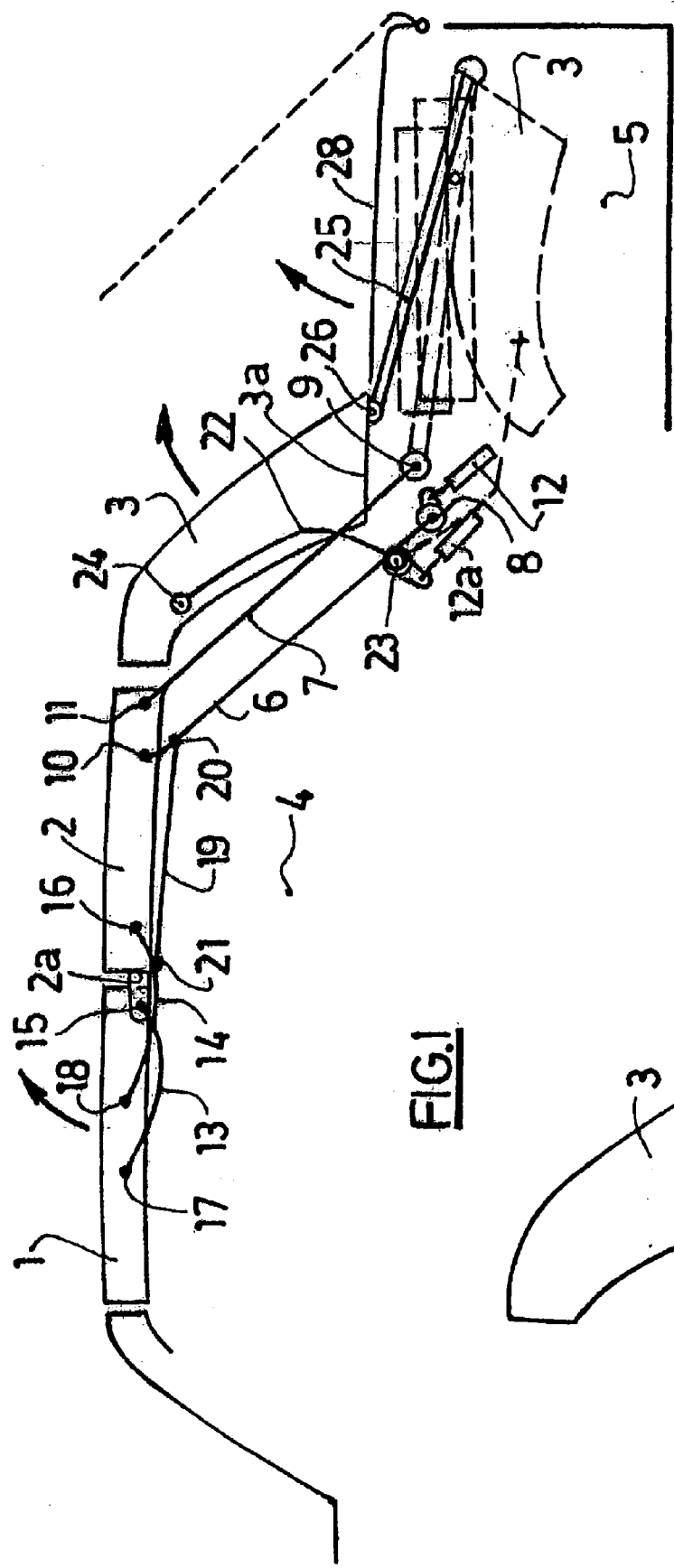
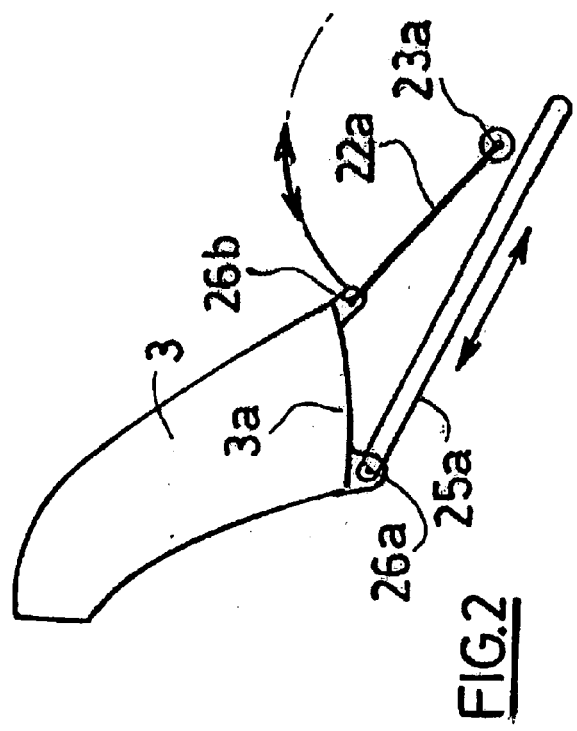
FIG.1
FIG.2

VEHICLE FOLDING ROOF, COMPRISING THREE ELEMENTS OF WHICH ONE IS NOT LINKED TO THE REAR ELEMENT

The present invention concerns a retractable roof or one which can be folded into the rear boot of a vehicle.

Such a retractable roof makes it possible in particular to convert a vehicle of the two-seater coupé or four-seater coupé or saloon type into a vehicle of the cabriolet type.

In the case of four-seater coupés or saloons, the roof is relatively long, so that the retractable roof consists of three elements, each of which has a length compatible with the dimensions of the boot of the vehicle.

A vehicle retractable roof is thus known, comprising a front roof element, an intermediate roof element and a rear roof element, these three elements being mobile between a position in which they cover the passenger compartment of the vehicle and a position in which they are superposed substantially horizontally in the rear boot of the vehicle.

In the example described in French patent application 00 14187 of 6, Nov. 2000 in the name of the applicant, the three roof elements are linked to one another by pivoting arms and levers. For this reason, the rear element cannot be moved independently of the other two elements.

The aim of the present invention is to provide improvements to the known means, in order to control and guide in an optimal manner the movement of the roof elements between their closure position and their storage position in the boot.

According to the invention, the retractable roof is characterised in that the front element is linked to the intermediate element, in that the rear element is not linked to the intermediate element and can be moved towards the rear boot by driving means independent of those controlling the movement of the intermediate element and the front element towards the rear boot, in that the intermediate element is linked to the vehicle body by two arms articulated to said body and to said intermediate element, one of said two arms being associated with means controlling its pivoting, the front of the intermediate element being linked to the front element by two levers articulated to said intermediate element and to said front element, one of said arms being linked to one of said levers by a link rod articulated to said arm and to said lever.

Thus, the movements of the rear element and of the other two elements can be controlled successively, that is to say independently of one another.

According to a preferred version of the invention, the movement of the rear element towards the boot is controlled, on the one hand, by a pivoting arm articulated to the body and to said rear element and, on the other hand, by a groove extending into the rear boot in which there is fitted a finger carried by the rear of said rear element so as to be able to slide in said groove.

Other specific features and advantages of the invention will emerge further in the description below.

In the accompanying drawings, given by way of non-limitative examples:

FIG. 1 is a schematic view of a retractable roof according to the invention;

FIG. 2 is a schematic view of the rear roof element and a variant of its means for driving and guiding its movement.

In the embodiment depicted in FIG. 1, the folding roof according to the invention comprises three rigid roof elements, namely a front element 1, an intermediate element 2 and a rear element 3 movable between a position in which they cover the passenger compartment 4 of the vehicle and a position in which they are stored superposed substantially horizontally inside the rear boot 5 of the vehicle.

In accordance with the invention, the front element 1 is linked to the intermediate element 2 and the rear element 3 is not linked to the intermediate element 2.

The rear element 3 can be moved towards the rear boot 5 by driving means independent of those controlling the movement of the intermediate element 2 and the front element 1 towards the rear boot 5.

The intermediate element 2 is linked to the vehicle body by two arms 6, 7 articulated at 8, 9 to said body and at 10, 11 to said intermediate element 2.

One 6 of said two arms 6, 7 is associated with means such as an actuator 12 for controlling its pivoting.

The front 2a of the intermediate element 2 is linked to the front element 1 by two levers 13, 14 articulated at 15, 16 to the intermediate element 2 and at 17, 18 to the front element 1.

One 6 of said arms 6, 7 is linked to one 14 of said levers 13, 14 by a link rod 19 articulated at 20 to the arm 6 and at 21 to the lever 14.

The movement of the rear element 3 towards the boot 5 is controlled, on the one hand, by a pivoting arm 22 articulated at 23 to the body and at 24 to the rear element 3 and, on the other hand, by a groove 25 extending into the rear boot 5 in which there is fitted a finger 26 carried by the rear 3a of the rear element 3 so as to be able to slide in the groove 25.

The pivoting of the arm 22 can be controlled for example by an actuator 12a.

According to a variant, the movement of the rear element 3 towards the boot 5 can be controlled by two pivoting arms spaced apart articulated on the one hand to the body and on the other hand to said rear element.

The, movement of the rear element 3 towards the boot 5 can be guided by two grooves spaced apart extending into the rear boot 5 in which there are fitted two fingers carried by the rear 3a of the rear element 3.

FIG. 2 shows that the arrangement of the pivoting arm 22a and the groove 25a can be reversed compared with that of FIG. 1.

In the case of FIG. 2, the groove 25a cooperates with a finger 26a carried by the front of the rear part 3a of the rear element 3.

Furthermore, the arm 22a is articulated at 26b to the rear of the rear element 3 and at 23a to a fixed part of the body.

An explanation will now be given of the operation of the retractable roof that has just been described.

In the position depicted in FIG. 1, the roof elements 1, 2, 3 are locked together and to fixed parts of the body and the lid 28 of the boot 5 is closed.

To open the roof, the unlocking of the roof elements 1, 2, 3 and the opening of the lid 28 of the boot 5 from the front towards the rear are controlled.

By means of a control, the actuator 12a is activated in order to make the arm 22 pivot towards the rear.

Said arm pushes the rear element 3 towards the rear, the finger 26 carried thereby guiding the movement of the rear element 3 along the groove 25.

At the limit of travel, the rear element 3 is accommodated, as depicted in dotted lines in FIG. 1, substantially horizontally in the boot 5.

Control of the pivoting of the arm 6 linked to the intermediate element 2 can be performed at the same time as control of the pivoting of the arm 22 linked to the rear element 3 or with a certain time shift.

The pivoting of the arms 6, 7 towards the rear drives the intermediate element 2 towards the rear.

The link rod 19 linking the arm 6 to the lever 14 moves the front element upwards, above the intermediate element 2.

At the limit of travel, the elements 1 and 2 are positioned above the rear element 3, inside the boot 5.

What is claimed is:

1. A vehicle folding roof, comprising at least three rigid roof elements, comprising a front element (1), an intermediate element (2) and a rear element (3) movable between a position in which the roof elements (1–3) cover a passenger compartment (4) of the vehicle and a position in which the roof elements (1–3) are stored superposed substantially horizontally below the boot lid (28) over the rear boot (5) of the vehicle, characterised in that the front element (1) is linked to the intermediate element (2), in that the rear element (3) is not linked to the intermediate element (2) and can be moved towards the rear boot (5) by driving means independent of those controlling the movement of the intermediate element (2) and the front element (1) towards the rear boot (5), in that the intermediate element (2) is linked to the vehicle body by two arms (6, 7) articulated to said body and to said intermediate element (2), one of said two arms (6, 7) being associated with means controlling the pivoting of said one of said two arms (6, 7), the front of the intermediate element (2) being linked to the front element (1) by two levers (13, 14) articulated to said intermediate element (2) and to said front element (1), one (6) of said arms being linked to one (14) of said levers by a link rod (19) articulated to said arm (6) and to said lever (14).

2. A retractable roof according to claim 1, characterised in that the movement of the rear element (3) towards the boot (5) is controlled, by a pivoting arm (22, 22a) articulated to the body and to said rear element (3) and, by a groove (25, 25a) extending into the rear boot (5) in which there is fitted a finger (26, 26a) carried by the rear of said rear element (3) and sliding in said groove (25).

3. A retractable roof according to claim 1, characterised in that the movement of the rear element (3) towards the boot (5) is controlled by two spaced apart pivoting arms articulated to the body and to said rear element (3).

4. A retractable roof according to claim 1, characterised in that the movement of the rear element (3) towards the boot (5) is guided by two grooves spaced apart extending into the rear boot in which there are fitted two fingers carried by the rear of said rear element (3).

* * * * *